US009542065B2

(12) United States Patent
Lacey et al.

(10) Patent No.: US 9,542,065 B2
(45) Date of Patent: *Jan. 10, 2017

(54) SYSTEM AND METHOD OF SKINNING THEMES

(71) Applicant: Black Berry Limited, Waterloo (CA)

(72) Inventors: Jon-David Kenneth Lacey, Upper Tantallon (CA); Mikhail Fomitchev, Thornhill (CA); Jose Jose Rojas, Toronto (CA); Stuart Garrood, Comox (CA)

(73) Assignee: BlackBerry Limited, Waterloo, CA (US)

( * ) Notice: Subject to any disclaimer, the term of this patent is extended or adjusted under 35 U.S.C. 154(b) by 601 days.

This patent is subject to a terminal disclaimer.

(21) Appl. No.: 13/954,055

(22) Filed: Jul. 30, 2013

(65) Prior Publication Data
US 2013/0318456 A1    Nov. 28, 2013

Related U.S. Application Data

(63) Continuation of application No. 12/950,439, filed on Nov. 19, 2010, now Pat. No. 8,504,923, and a
(Continued)

(51) Int. Cl.
*G06F 3/048* (2013.01)
*G06F 3/0481* (2013.01)
*G06F 9/44* (2006.01)

(52) U.S. Cl.
CPC ............... *G06F 3/0481* (2013.01); *G06F 8/38* (2013.01)

(58) Field of Classification Search
CPC ...... G06F 17/211; G06F 17/27; G06F 17/248; G06F 17/2705; G06F 3/0481; G06F 8/38
See application file for complete search history.

(56) References Cited

U.S. PATENT DOCUMENTS 6,473,069 B1    10/2002    Gerpheide
6,477,549 B1    11/2002    Hishida et al.
(Continued)

FOREIGN PATENT DOCUMENTS

WO    03017077    3/2003

OTHER PUBLICATIONS

Thierry Violleau, "Technology and XML, part 1—An Introduction to API's for XML Processing", Java Technology and XML, pp. 1-22, Nov. 30, 2001.
(Continued)

*Primary Examiner* — Tadeese Hailu
(74) *Attorney, Agent, or Firm* — Moffat & Co.

(57) ABSTRACT

A mobile communication device and non-transitory computer readable memory is provided. A processor executes instructions to provide a parser for parsing at least one skinning theme document into a template describing rendering characteristics of a graphical interface, the skinning theme document identifying at least one data element. The instructions also provide an interaction interface for receiving from data from at least one application associated with one or more of the at least one data element. A renderer is provided for rendering the received data on a display in accordance with the template as the graphical interface wherein the graphical interface presents one or more data elements of the at least one application that is rendered.

18 Claims, 11 Drawing Sheets

Related U.S. Application Data continuation of application No. 11/748,751, filed on May 15, 2007, now Pat. No. 7,840,901.

(60) Provisional application No. 60/800,416, filed on May 16, 2006.

(56) References Cited

U.S. PATENT DOCUMENTS

| | | | |
|---|---|---|---|
| 7,093,198 B1* | 8/2006 | Paatero | G06F 9/4443 |
| | | | 715/746 |
| 7,426,691 B2 | 9/2008 | Novak et al. | |
| 7,480,868 B2 | 1/2009 | Novak et al. | |
| 7,490,295 B2 | 2/2009 | Chaudhri et al. | |
| 7,546,543 B2 | 6/2009 | Louch et al. | |
| 7,571,426 B2 | 8/2009 | Carroll, Jr. | |
| 7,610,352 B2 | 10/2009 | AlHusseini et al. | |
| 8,010,899 B2* | 8/2011 | Choi | G06F 17/2247 |
| | | | 715/746 |
| 2003/0160822 A1 | 8/2003 | Belz et al. | |
| 2004/0003067 A1 | 1/2004 | Ferrin | |
| 2004/0111673 A1* | 6/2004 | Bowman | G06F 9/4443 |
| | | | 715/234 |
| 2004/0143823 A1 | 7/2004 | Wei | |
| 2004/0201603 A1 | 10/2004 | Kalish | |
| 2004/0216054 A1 | 10/2004 | Mathews et al. | |
| 2004/0223009 A1 | 11/2004 | Szladovics et al. | |
| 2004/0261032 A1* | 12/2004 | Olander | G06F 3/0482 |
| | | | 715/747 |
| 2004/0268228 A1 | 12/2004 | Croney et al. | |
| 2004/0268231 A1 | 12/2004 | Tunning | |
| 2005/0022174 A1 | 1/2005 | Lauterbach et al. | |
| 2005/0044504 A1 | 2/2005 | Fernandez et al. | |
| 2005/0050474 A1* | 3/2005 | Bells | G06F 9/4443 |
| | | | 715/746 |
| 2005/0057560 A1 | 3/2005 | Bibr et al. | |
| 2005/0102626 A1 | 5/2005 | Novak et al. | |
| 2005/0155027 A1 | 7/2005 | Wei | |
| 2005/0210051 A1 | 9/2005 | Novak et al. | |
| 2005/0233287 A1 | 10/2005 | Bulatov et al. | |
| 2005/0268279 A1 | 12/2005 | Paulsen et al. | |
| 2006/0059430 A1* | 3/2006 | Bells | G06F 3/0484 |
| | | | 715/747 |
| 2006/0168101 A1 | 7/2006 | Mikhailov et al. | |
| 2006/0236254 A1 | 10/2006 | Mateescu et al. | |
| 2008/0134018 A1 | 6/2008 | Kembel et al. | |
| 2008/0195626 A1 | 8/2008 | Ukigawa et al. | |
| 2009/0019064 A1 | 1/2009 | Takafuji | |
| 2009/0083300 A1 | 3/2009 | Wake et al. | |

OTHER PUBLICATIONS

European Patent Office, Decision of Appeal Board for Application No. 07719786.1, issued on Mar. 19, 2015.

Intellectual Property India, Office Action on Application No. 1673/DELNP/2008, Issued on Jun. 29, 2016.

* cited by examiner

```
Include MediaEngine.content_interaction_API                    400
                                                                ↙
Main () {       405
integer data_int = 0;
string data_str = ' ';      407
        do {
                if (User_Input == 'scroll_wheel'){
                        data_int = data_int +1;
                        ME:update_data_element('data_int',data_int);
                }
                if (data_int==5){
                        data_str = "Big Int";
                        ME:update_data_element('data_str',data_str);
                        ME:notify_custom_event('big_int');
                }
                if (data_int==10){
                        data_int=0;
                        ME:update_data_element('data_int',data_int);
                        data_str = "Small Int";
                        ME:update_data_element('data_str',data_str);
                        ME:notify_custom_event('small_int');
                }
        loop
}
```

Figure 4

SYSTEM AND METHOD OF SKINNING THEMES

CROSS REFERENCE TO RELATED APPLICATIONS

This application is a continuation of application Ser. No. 12/950,439 filed on Nov. 19, 2010, now allowed, which is a continuation of non-provisional application Ser. No. 11/748,751 filed May 15, 2007 issued as U.S. Pat. No. 7,840,901 on Nov. 23, 2010, which claims the benefit of U.S. Provisional Application No. 60/800,416 filed May 16, 2006 the contents of which are both hereby incorporated by reference.

TECHNICAL FIELD

The present patent disclosure relates generally to a communications system for providing communications to a plurality of devices and specifically to a system and method of skinning themes.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Scalable Vector Graphics (SVG) is an extensible markup language (XML) markup for describing two-dimensional vector graphics. An application may use an SVG file to represent its user interface (UI). This SVG file can be referred to as the application's "skin". Basic graphical UI requirements include the fact that an application must be able to graphically represent its status and react to input from the graphical user interface. The application should be able to:
 a) react to user input from the GUI. Without this, applications will be limited to passively representing status. Most applications require some form of user interaction.
 b) graphically reflect status to the user. Without this an application will not be able to represent status related to the business logic. The UI will be limited to accepting user input. Most applications have a requirement to display information about their status to the user. In general, both a) and b) must be satisfied.

Traditional application graphical user interfaces are hard-coded along with the application logic. That is the look and behavior of the user interface is programmed with the application logic in a program like Java or C++ and embedded along with the application.

BRIEF DESCRIPTION OF THE DRAWINGS

An embodiment of the patent disclosure will now be described by way of example only with reference to the following drawings in which:

FIG. 4 shows in a pseudo code listing an example application, in accordance with an embodiment of the present disclosure;

DETAILED DESCRIPTION

Figure 1:
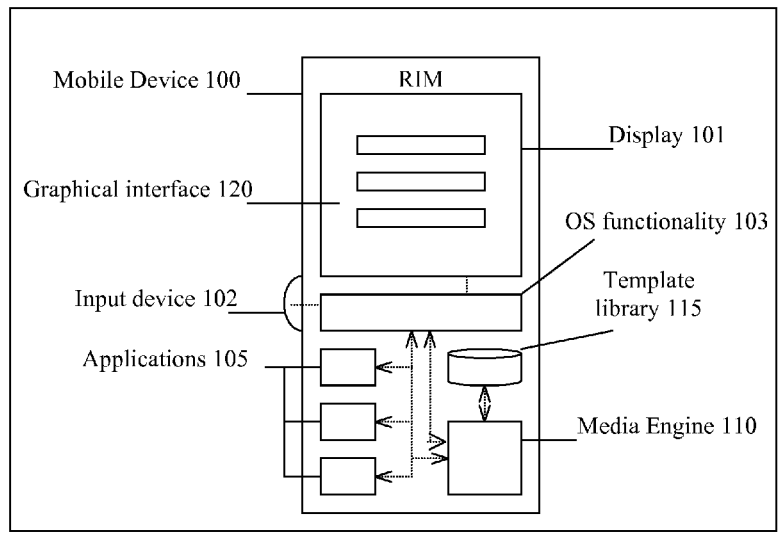
FIG. 1 shows in a functional schematic an example of a mobile device, in accordance with an embodiment of the present patent disclosure.

In accordance with an aspect of the present disclosure there is provided a mobile communication device comprising: a display; a processor coupled to the display; and a memory coupled to the processor containing instructions which when executed by the processor provide: at least one application; at least one skinning theme document; and a media engine comprising: a parser for parsing the at least one skinning theme document into a template describing rendering characteristics of a graphical interface, the skinning theme document identifying at least one data element; an interaction interface for receiving from data from the at least one application associated with one or more of the at least one data element; and a renderer for rendering the received data in accordance with the template as the graphical interface wherein the graphical interface presents one or more data elements of the at least one application that is rendered.

In accordance with another aspect of the present disclosure there is provided a non-transitory computer readable memory containing instructions which when executed by a processor of a mobile communication device cause the processor to provide: a parser for parsing at least one skinning theme document into a template describing rendering characteristics of a graphical interface, the skinning theme document identifying at least one data element; an interaction interface for receiving from data from at least one application associated with one or more of the at least one data element; and a renderer for rendering the received data on a display in accordance with the template as the graphical interface wherein the graphical interface presents one or more data elements of the at least one application that is rendered.

A goal of skinning is to separate the presentation (GUI) of the application from the business logic (functionality) and allow the GUI to be defined through some external file which can be created and "late bound" to application code. In order to allow this late binding there must be a common understanding or contract between the application logic and the skin. An interface must be defined, that the application can interface with, to control the UI and a skin must be created that satisfies this interface.

The present disclosure provides a skinning themes document for skinning themes for an application. The skinning themes document comprises at least one data element representing data generated by an application and at least one custom event representing events generated by the application. The interface that allows for the late binding of the GUI defined by the skinning theme document to the application information, that is the data elements and the custom events, is provided by a media engine.

Embodiments of the present patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

FIG. 1 shows in a functional schematic an example of a mobile device 100, in accordance with an embodiment of the present patent disclosure. Mobile device 100 comprises a display 101, an input device 102, an operating system 103, various applications 105, a media engine 110a and a template library 115. Although multiple applications may be present on the mobile device, the following description describes a mobile device that has only a single application 105. The template library 115 may include multiple template files. Alternatively a single template file may be used in place of the template library 115. Examples of an application 105 include a home screen application, a calendar application, an email application, a time application etc.

Figure 2:
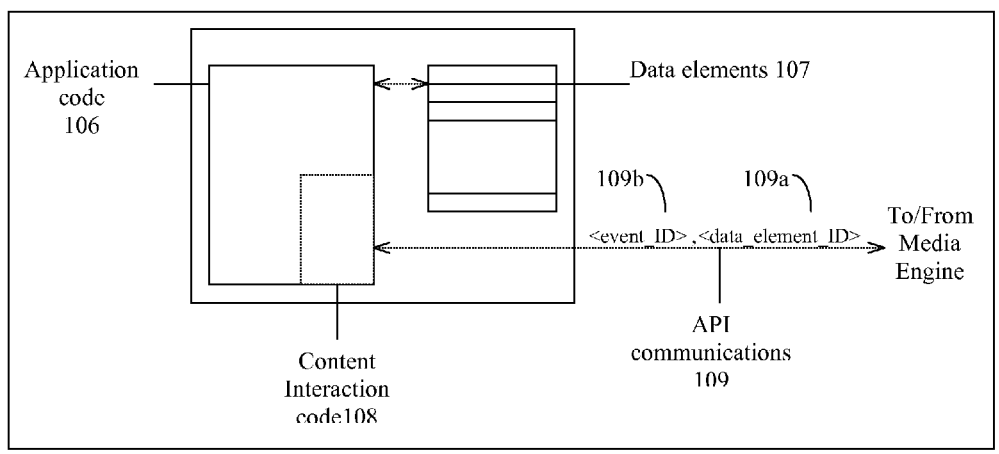
FIG. 2 shows in a functional schematic an example of an application, in accordance with an embodiment of the present disclosure.

FIG. 2 shows in a functional schematic an example of an application 105, in accordance with the present disclosure. The application 105 is a collection of at least application code 106 that performs some business logic, and application data elements 107 that the application code 106 can manipulate or modify. The application 105 works in conjunction with the media engine 110a to display application information on the display of the device. In addition to the business logic the application code 106, also includes content interaction logic or code 108. This content interaction code communicates with the media engine 110a in order to notify it of updates to data elements 107, or the occurrence of custom events. The communication is represented schematically by 109. The communications informing the media engine of updates to data elements 107 is shown as 109a, and the communications informing the media engine of the occurrence of custom events is shown as 109b.

Figure 3A:
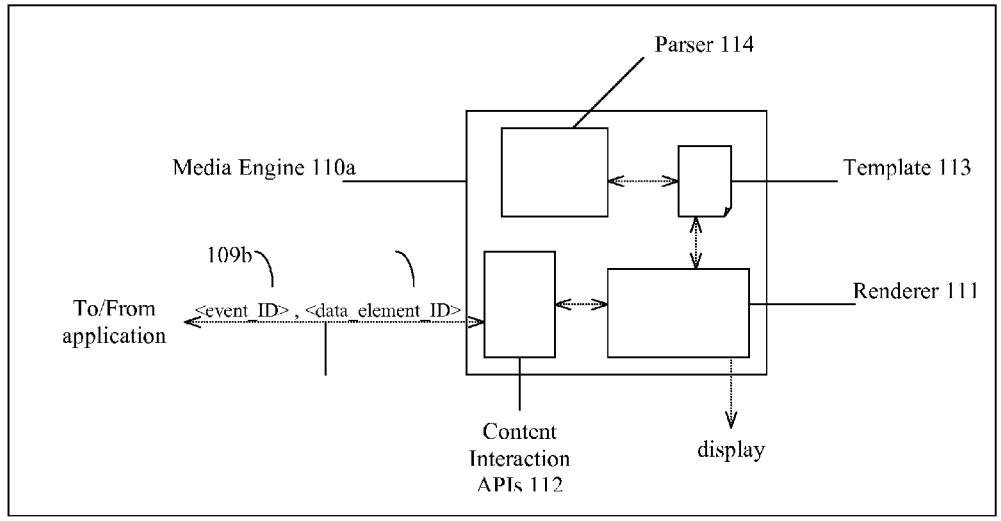
FIG. 3a shows in a functional schematic an example of a media engine, in accordance with an embodiment of the present disclosure.

FIG. 3a shows in a functional schematic an example of a media engine 110a, in accordance with the present disclosure. The media engine 110a includes a renderer 111 for rendering the graphical interface to the device display, content interaction APIs 112 for interfacing with the application 105, a template 113 for holding the graphical interface information, and a parser 114 for parsing the graphical interface information from a template file. Although the media engine 110a creates a template 113 for holding the template information that is parsed from the template file, it could alternatively use the information directly from the parser 114, without the intermediate template 113.

One approach to skinning is to define a scalable vector graphics (SVG) document which acts as a template file for the user interface for the application. More specifically, in order to satisfy both requirements of reacting to user input and graphically reflecting the application status, a mechanism for implementing a contract between an SVG template document and application code 106 is developed. In one embodiment the application 105 is responsible for handling user input and the media engine 110a is responsible for defining and displaying the graphical interface 120. To graphically reflect the application status, the application code 106 defines a set of "data elements" and "custom events" that represent specific data and events that are generated by the application 105. A data element 107 is some information that the application 105 manipulates or modifies and can be presented on the graphical interface 120. A data element 107 is assigned a name which is a string. A custom event is some event of significance that occurs in the application's business logic which may need to be reflected in the graphical user interface 120. Similar to data elements 107, custom events are assigned a name which is a string. It is not the responsibility of the application 105 to define what user interface changes occur as a result of these events, or how to display the information of data elements 107. The application's responsibility is to inform the media engine 110a whenever it needs to update the information associated data elements 107 and when custom events occur.

In one embodiment the template file defines the custom events and data elements that are displayed in the graphical interface. The application code 106 determines what application data elements 107 or custom events (which may include user input events) to bind to the data elements and events defined in the graphical interface.

A skinning themes document is written for an application 105 using the names of the data elements 107 and the names of the custom events. The skinning theme document, or template file, describes how to display the information associated with the data elements 107 and custom events.

The media engine 110a acts as an interface between the application 105 and the graphical interface template file. The application 105 notifies the media engine 110a of updates to data elements 107 and the occurrence of custom events. The media engine 110a uses the skin template file to define how to display this information on the display 101. Using the skin document as a template, the media engine 110a, or more particularly the renderer 111 of the media engine 110a, renders the graphical interface 120 to the display 101.

The media engine 110a uses the template file for describing how to render a graphical interface 120. The media engine may use a parser 114 to parse the template information form the template file and store it in a template 113 that is accessible to the media engine 110a. If the template file describes the graphical interface 120 using a markup language, then the parser 114 would be able to read the markup language and store the template information in the template 113. For example, if the template file defines the graphical interface 120 in SVG, then an SVG parser would read the template information in the SVG file and store the parsed information in a template 113. The parser may be referred to as a transcoder since it translates the template file code into code representing the template 113. The template 113 holds the template information in a form expected by the media engine 110a and the renderer 111. As previously described, the template 113 is not required. It is possible for the parser 114 to provide the template information directly to the media engine 110a or the renderer 111.

The media engine 110a described above is not involved in the processing of user input. It receives a template file defining a graphical interface 120, and notifications from an application 105 regarding data elements 107 and custom events. In the above example an application 105 would be responsible for handling user input. This may be accomplished by interacting with functionality provided by an input device driver, with operating system functionality, or other methods as may be known.

Figure 3B:
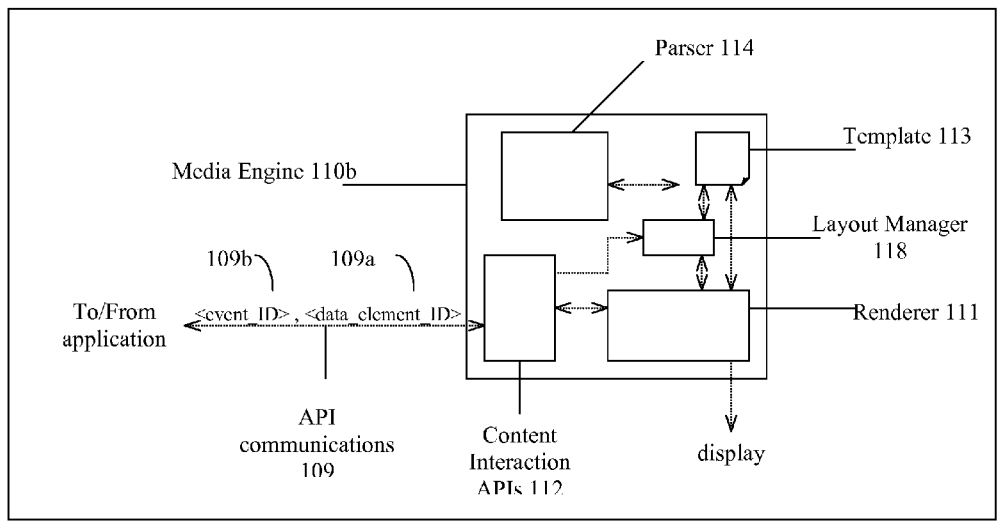
FIG. 3b shows in a functional schematic another example of a media engine, in accordance with an embodiment of the present disclosure.

FIG. 3b shows in a functional schematic another example of a media engine 110b, in accordance with an embodiment of the present disclosure. The media engine 110b further includes a layout manager 118 for optionally controlling the display of template information.

Figure 3C:
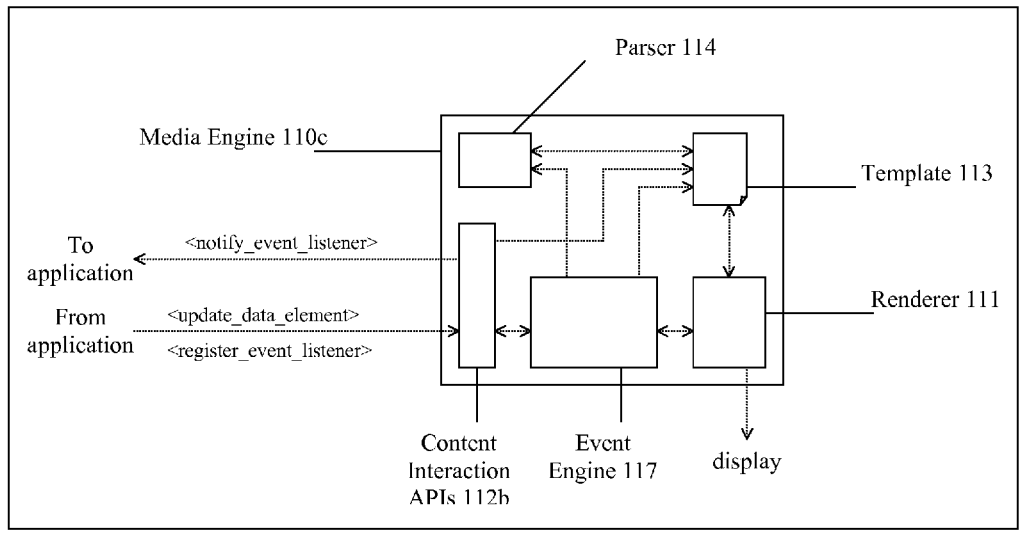
FIG. 3c shows in a functional schematic another example of a media engine, in accordance with an embodiment of the present disclosure.

FIG. 3c shows in a functional schematic another example of a media engine 110c, in accordance with another embodiment of the present disclosure. The media engine 110c is similar to the media engine 110a previously described, however media engine 110c also has an event engine 117. The event engine 117 adds functionality to the media engine 110c. It can provide user input control. An application 105 that makes use of the event engine's 117 user input features can include code to notify the application 105 of any user input. Those skilled in the art will appreciate that many different forms of user input are possible. An application 105 may be notified in different manners.

An application 105 may notify the event engine 117 that it wishes to be informed when ever a user input occurs. This notification can be achieved by an API call to the content interaction APIs 112b of the media engine 110c. The content interaction APIs 112b would include additional calls for providing the user input control to an application 105. The call should include information the event engine 117 can use to notify the application 105. This information can include the application identifier, the function that the event engine 117 is to call when an event occurs. The call may also indicate the types of user input events the application 105 is interested in. For instance an application 105 may only wish to be notified of input from a scroll wheel, or from a keyboard, or pointing device, etc. When ever a user input event occurs the event engine 117 checks to see if any applications 105 are to be notified, and if there are any, it sends a notification of the event.

An application does not necessarily need to notify the event engine 117 that it wishes to receive notification of input events. Alternatively the application may poll the event engine 117 to determine if an event has occurred, and if one has to receive it. The application would make a call to a content interaction API 112b querying or requesting an user input event.

As described above an application 105 in accordance with the present disclosure may obtain user input in various ways. The above description can also apply to not only user input events but also to system events or other generated events. For example an application 105 may register with the event engine 117 through the content interaction APIs 112b to receive notification each time the display 101 is refreshed.

In addition to the event handling described above the event engine 117 may also act as a controller of the media engine 110c. The event engine 117 may control the times at which a graphical interface 120 is refreshed. This can be accomplished through the use of an event engine 117 timer that fires an event at a certain frequency. When ever the event fires, the event engine 117 can access the template 113, and provide the template information to the renderer 111 along with the values of data elements 107 and information regarding the occurrence of events. The renderer 111 then uses this information to render a graphical interface 120 to the display 101.

As described in the above paragraph, the media engine 110c or more particularly the event engine 117 stores the template information separately from the data element and event information. It may be desirable to store all the information in the template 113. When a notification of a change to data elements 107 arrives via the content interaction APIs 112b, the event engine 117 may store this information in the template 113. In this manner the renderer 111 only needs reference to the template 113 object to render the graphical interface 120. This can be achieved by in various ways. For example the event engine 117 may pass a copy of the template 113 information to the renderer 111, it may pass a reference to the template 113 to the renderer 111. Alternatively the renderer 111 may be designed to access a template 113 located in a specific location. The event engine 117 would be responsible for ensuring that the proper template is located in the location. This method can be used advantageously as the media engine 110c may have numerous templates that the event engine 117 keeps updated with the application data element information and event information. The event engine 117 can then be used to switch graphical interfaces 120 by updating the specific location with the desired template.

The above description has described various calls that can be made to the content interaction APIs 112, 112b. Below is a listing of possible API calls that the media engine 110a, 110b, 110c should support. It must support at a minimum the update data call. Without this support the application cannot pass information to the media engine 110a, 110b, 110c to display.

int update_data_element(string element_ID, string element_value)
    used to notify the media engine to update the element_ID with the new element_value
    returns an int for error purposes, may be other type or no return int notify_custom_event(string custom_event_ID)
    used to notify the media engine of the occurrence of custom_event_ID
    returns an int for error purposes, may be other type or no return bool query_new_event(string event_filter)
    used to determine if a new event has occurred. The event_filter can be used to specify the type of events that are of interest. This call is normally implemented in media engines that use an event engine.
    returns true if a new event has occurred that matches event_filter, false otherwise string get_new_event(string event_filter)
    used to get a new event that matches event_filter. This call is normally implemented in media engines that use an event engine.
    returns a string representing the event bool register_event_listener (string application_ID, string listener_ID, string event_filter)

used to register an event listener with the media engine. application_ID is an identifier used to identify the application. The listener_ID is used to determine the listener to register. This may be a function ID of the application. The event_filter can be used to specify the type of events that are of interest. This call is normally implemented in media engines that use an event engine.

returns true if the listener_ID associated with the application_ID could be registered to be notified of events that match event_filter The above calls and descriptions are just an example, those skilled in the area will recognize that more or fewer calls can be included, with different parameters and return values, while maintaining the functionality of the media engine 110a, 110b.

Figure 3D:
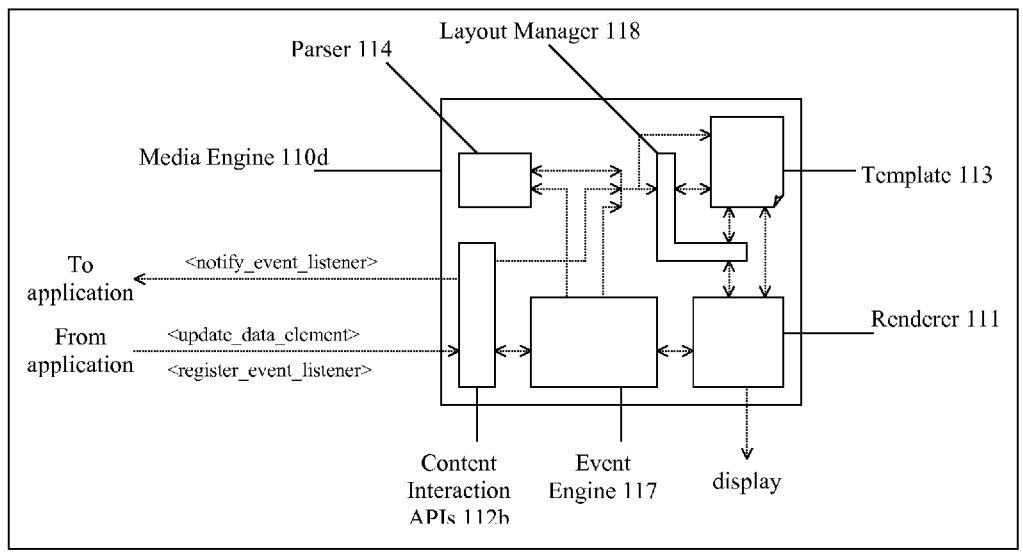
FIG. 3d shows in a functional schematic another example of a media engine, in accordance with an embodiment of the present disclosure.

FIG. 3d shows in a functional schematic another example of a media engine 110d, in accordance with an embodiment of the present disclosure. The media engine 110d is similar to the media engines 110a, 110c previously described, however media engine 110d also has a layout manager 118 similar to media engine 110b. The layout manager 118 may be used to handle the dynamic layout of data elements that are found in the template 113.

Data elements may be passed to the media engine as a string that can vary in length. The varying length of the string presents problems when laying out a graphical interface 120. If the string is too long, it may overlay other parts of the graphical interface 120. If the text is too short, other elements may not align properly. In the above examples of media engine 110a, 110c, although providing for flexibility of the specification of the graphical interface 120, no easy way of dynamically handling the size of data elements was described. Either the media engine must make some predetermined decision on how to handle the length of strings, such as truncating all strings that are too long. All though this works well, the layout manager 118 provides even greater flexibility to the media engines 110b, 110d by providing a way of specifying how to handle the dynamic display of data elements. This allows a graphical interface designer to describe how data elements are to be handled by including layout manager 118 control information in the template file. As an example the template 113 and layout manager 118 may be used to specify that a data element is to be 10 characters long, and that if the data element provided to the media engine is longer than 10 characters, that it should be truncated to 5 characters long, and the string '( . . . )' appended to the end of the string. As another example, a graphical interface designer may wish to have the characters of a particular data element appear as all upper case characters. This can be specified in the template file. The layout manager would receive the data element string and modify it as determined by the template 113, in this case changing all of the characters to upper case. This manipulation of the data element is performed by the layout manager 118. The layout manager may be controlled by including, in the template 113 or the template file, directions to the layout manager 118 specifying how the length of a data element should be modified. The renderer 111 will then display the sting as prepared by the layout manager 118. The layout manager 118 allows for the text style of data elements to be specified and dynamically controlled.

As shown schematically in FIG. 3d, the layout manager may alter the data elements according to the dynamic layout described in the template and these changes may be stored directly in the template 113. The renderer 111 then uses the template 113 in the same manner as previously described. Alternatively the data elements may be stored in the template 113 (or separate from the template 113) as provided from the application 105. The layout manager 118 may alter the data elements as they are provided to the renderer 111. The layout manager may modify display characteristics of the element such as its placement, size, visibility, etc. In this manner the renderer receives the data elements as string describing the data element as provided by the application 105, and modified by the layout manager 118 in such a manner as described in the template 113.

The layout manager may be used to control the display of elements other than text elements. A layout manager may be used to dynamically control the display characteristics of graphical information as well. A graphical interface designer may wish to display a graphic or image in a certain location only if there is no text that would be covered by its placement. The layout manager 18 can be used to provide a means of controlling the display of the element. For example if graphical interface 120 describes that an icon is to be displayed in a location free of text, the icon element can be passed to the layout manager 118, along with layout manager control information specifying the layout requirements. The layout manager may then dynamically alter the display information of the element in the template 113 prior to the element being rendered. The layout manager 118 may alter the coordinates specifying the placement of the icon, or it may determine that there is no space available on the graphical interface 120, and so the icon should not be displayed. The modified element with the dynamic display characteristics can then be passed to the renderer 111 for rendering to the graphical interface 120.

The layout manager 118 can provide a means of manipulating data elements prior being rendered by the renderer 111, as well as providing a means of dynamically controlling the display characteristic of elements that the renderer 111 may not be able to render appropriately. The template 113 can specify information for controlling the layout manager 118.

FIG. 4 shows in a pseudo code listing an example application 400. The example application 400 is contrived to describe the functioning of the system and methods of the present disclosure. The example application 400 defines two data elements. The first 405 is an integer named 'data_int', the second 407 is a string named 'data_str'. The example application 400 adds one to the value of data_int, which is initially zero, each time it receives a 'scroll_wheel' user input. The example application 400 may receive this information from the operating system 103. Additionally or alternatively, the application may be designed to make use of the event engine's 117 user input functionality previously described. When the value of data_int is equal to five, the example application 400 changes the value of data_str to 'Big Int' and creates a custom event named 'big_int_event'. When the value of data_int is equal to 10, the value is reset to zero, the value of data_str is changed to 'Small Int' and a custom event named 'small_int_event' is created.

The example application 400 notifies the media engine 110a, 110b, 110c, 110d of any changes to the value of a data element 405, 407 using the media engine API call named 'update_data_element'. The update_date_element expects a string identifying the ID of a data element. This is chosen to be the same as the name of the application data_element. This is not a requirement of the system, but rather is an easy way to ensure consistency when updating data elements. The string for data_element_ID representing an element in an array of data elements may be constructed by appending the array name with the index number of the particular element. The update_data_elements also expects a value representing the updated value of the data element 405, 407. An example definition of the API used for notifying the media engine of updates to data elements is:

Int update_data_element(string data_element_ID, string value)

The update_data_element defined above returns an integer that may be used for error detection. It may be used to detect various conditions, such as if the data element 107 could not be located, or if the value could not be changed, or if the value was updated properly, etc. The call expects a string representing the ID of a data element 107. This ID is the string that the template file uses to describe how to display the data element 107. It could alternatively be another type, such as an integer, as long as the template file used the same type for identifying the data elements 107. The value of the data element 107 is defined as a string, again this could be changed to another type, as long as the template file described how to display the type.

The example application 400 notifies the media engine 110*a* of the occurrence of any custom events using a media engine API call named 'notify_custom_event'. The notify_custom_event call expects a string identifying the ID of a custom event. The string could be replaced by an integer or other type, as long as the template file uses the same type for identifying the events. An example of the API used for notifying the media engine of the occurrence of events is:

Int notify_custom_event(string event_ID,)

The notify_custom_element defined above returns an integer that may be used for error detection. The call expects a string representing the ID of a custom event. This ID is the string that the template file uses to identify the event. It could alternatively be another type, such as an integer, as long as the template file used the same type for identifying the event.

The example application 400 of FIG. 4 does not include any code that controls how or when the information is displayed. It contains code to control user input, notify the media engine 110*a*, 110*b*, 110*c*, 110*d* of updates to date elements 405, 407 and of the occurrence of events. The media engine 110*a*, 110*b*, 110*c*, 110*d* uses the template 113 to determine how to render the information to the display.

A template file for specifying a graphical interface 120 to the example program can be created using a markup language. Below is an example of a possible template file that describes how to display the example application 400 information.

Example GUI 1

```
<text id ="data_int" x="5" y="5" font-family="myfont" font-size="15"
    fill="black">not set</text>
<set xlink:href="data_int" attributeName="fill" to="green"
    begin="custom(Big_Int)" end="custom(Small_Int)"/>
<set xlink:href="data_int" attributeName="fill" to="red"
    begin="custom(Small_Int)" end="custom(Big_Int)"/>
```

The above shows an exert from a template file that could be used with the example application. It defines a <text> element with an ID of 'data_int'. This is the same ID that the application sends to the media engine 110*a*, 110*b*, 110*c*, 110*d*. The <text> element specifies how to format and position the text on the display 101. The exert also defines two <set> elements. These elements are used to change the way the renderer 111 renders the information based on application events. When a 'Big_Int' custom event arrives at the media engine 110*a*, 110*b*, 110*c*, 110*d* from the example application 400, the fill colour of the data_int element is changed to green. The set element also defines when to stop using the associated <set> characteristics, in the above case this is when the custom event 'Small_Int' is received at the media engine 110*a*, 110*b*, 110*c*, 110*d*. The second set element describes the display properties of data_int when the custom event 'Small_Int' is received. It describes setting the elements fill colour to red.

The above template only describes displaying one data element 405 for the example application 400 that defines two data elements 405, 407. The application data element data_str is not displayed. The media engine 110*a*, 110*b*, 110*c*, 110*d* can discard or disregard any updates of this data element 407 it receives from the example application 400.

Another possible template file describing a different graphical interface 120 for the same example application is:

Example GUI 2

```
<text id ="data_int" x="5" y="5" font-family="myfont" font-size="15"
    fill="black">not set</text>
<text id ="data_str" x="5" y="25" font-family="myfont2" font-size="10"
    fill="grey">not set</text>
```

The above example graphical interface 120 describes the position of both data elements 405, 407 of the example application 400. This interface does not make use of the custom events sent from the example application 400. The media engine may discard or disregard the notification of custom events from the example application 400.

Figure 5A:
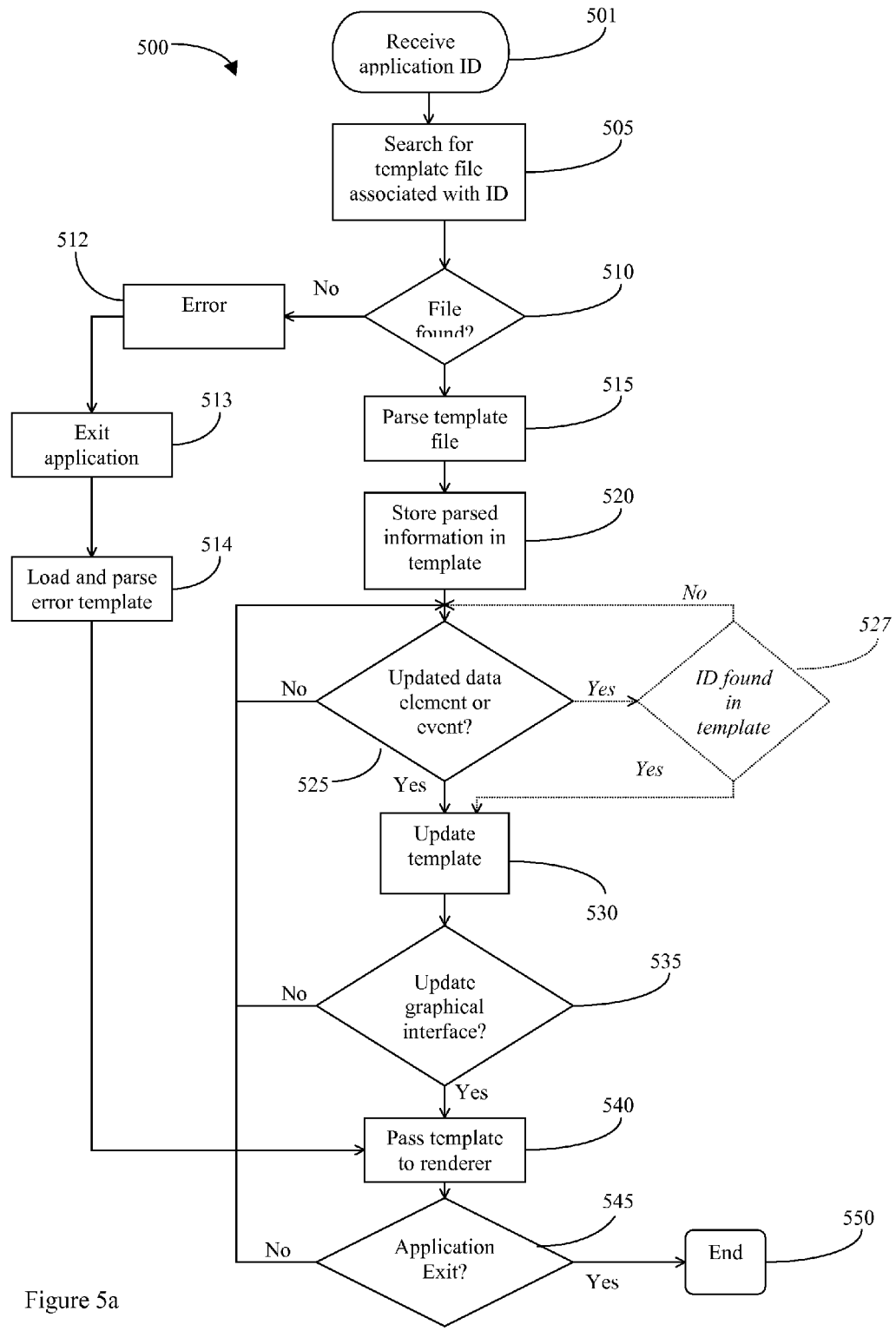
FIG. 5a shows in a flow chart an example of a method for creating a graphical interface associated with an application, in accordance with an embodiment of the present disclosure.

FIG. 5*a* shows in a flow chart 500 a method for creating a graphical interface 120 associated with an application 105 according to the present disclosure. An application 105 starts on the device and notifies the media engine 110*a*, 110*b*, 110*c*, 110*d* of its ID. The media engine 110*a* uses this ID to locate a template file in the template library (501). Other methods of associating a template file with an application will be apparent to one skilled in the art. If the media engine 110*a*, 110*b*, 110*c*, 110*d* determines that no template file was found (510); an error is formed (512). This error may be reported back to the application 105.

The media engine 110*a*, 110*b*, 110*c*, 110*d* may also present an error on the screen. One option to do this is shown. The application 105 exits in response to the error (513). The media engine 110*a*, 110*b*, 110*c*, 110*d* loads and parses an error template from the library (514). This error template file may be a standard graphical interface describing only static objects that is no application data elements 107 or application custom events. The template 113 is passed to the renderer 111 (540) which then renders the template 113 to the display 101. The media engine determines that the application has exited (545) and ends the processing at step 550.

If the template file is found it is passed to the parser 114 (515) which parses the template file and stores the template information in a template 113 (520). The media engine 110*a* then waits to receive updates to data elements 107 or notification of custom events (525). When a data element 107 update or custom event notification arrives, the ID is checked (527). If the data element or event ID is found in the template 113, the processing continues to step 530. If the ID is not found in the template 113, then processing returns to step 525, effectively discarding the update or notification. The updated information or notification information is used to update the template 113 (530). In this case the media engine 110a, 110b, 110c, 110d stores the information in the template 113. It may be desirable to store the data element 107 and event information apart from the template 113. In this case instead of updating the template 113 the media engine 110a, 110b, 110c, 110d would store the information. If the media engine 110a, 110b, 110c, 110d stores all the information received from an application 105 the step of checking the template for the IDs (527) may be skipped. Alternatively the IDs may not need to be checked if the media engine only receives data elements or events for IDs used by the template 113. This may be used to allow the switching of graphical interfaces 120 without requiring the application 105 to communicate all of the information again. The media engine 110a, 110b, 110c, 110d determines if the graphical interface 120 should be updated (535). If it is not to be updated processing returns to step 525. If it is to be updated the template 113 is passed to the renderer (540). As previously disclosed, other options exist for passing the display information to the renderer 111. After the information is passed to the renderer 111 the media engine 110a, 110b, 110c, 110d determines if the application has exited (545) if it has not, processing returns to step 525. If the application has exited then the processing ends (550).

Figure 5B:
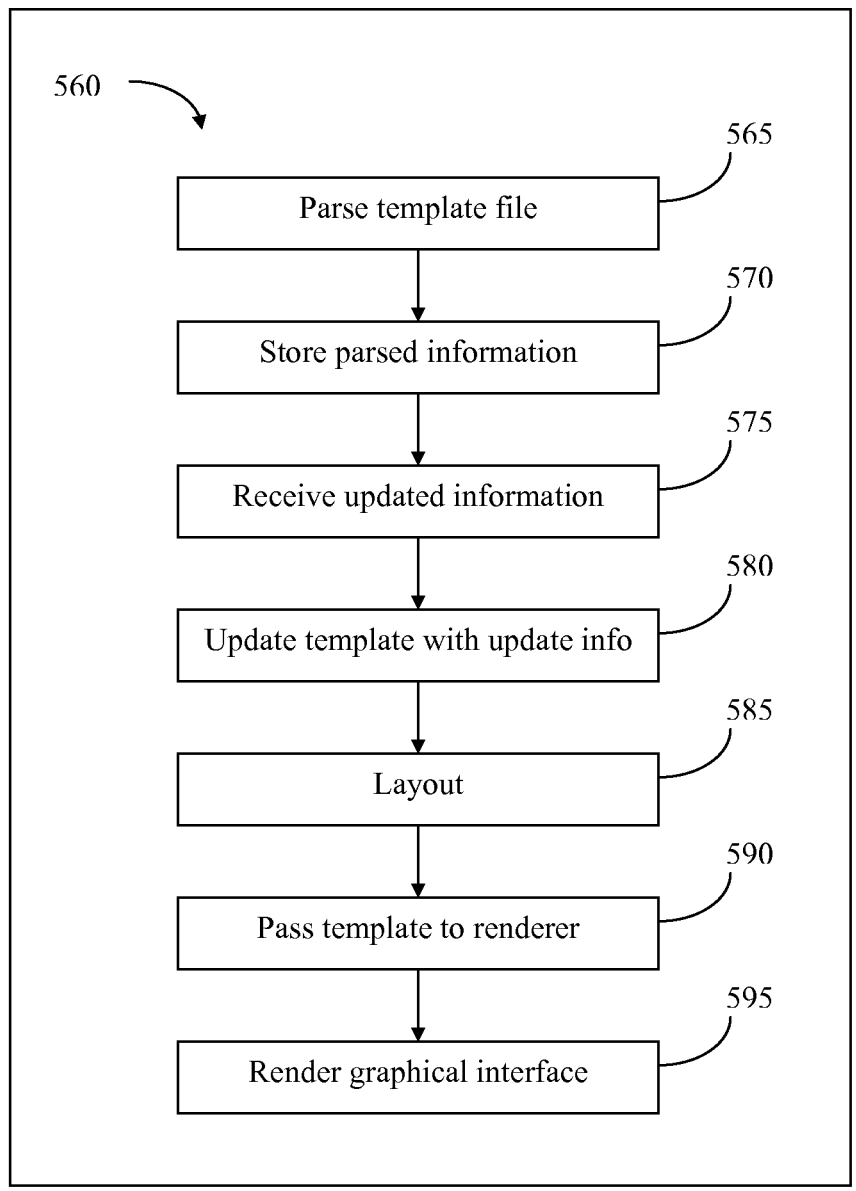
FIG. 5b shows in a flow chart another example of a method for creating a graphical interface associated with an application, in accordance with an embodiment of the present disclosure.

FIG. 5b shows in a flow 560 chart another method for creating a graphical interface 120 associated with an application 105 according to the present disclosure. The parser 114 parses template information (565) from a template file and stores it in a template 113 (570). Updated data element information is received from an application 105 through the use of the content interaction API (575). The template 113 is updated with the received update data element information (580). The layout of the data element information is controlled using a layout manager 118 (585). This may include truncating a data element string, appending other characters to the data elements, changing the display characteristics of the elements or other modifications. The template 113 is passed to the renderer 111 (590) and the renderer renders the graphical interface 120 (595).

A skinning system comprises a media engine 110a, 110b, 110c, 110d for rendering an SVG document 115 on a device 100. The media engine 110a, 110b, 110c, 110d includes a skinning API (or a content interaction API) 112. The skinning system also includes an SVG language document 115 and an SVG transcoder or parser 114. A content developer uses the SVG language and the SVG transcoder to create a skinning document as the template file. An application developer uses the media engine 110a, 110b, 110c, 110d and skinning API 112. A device application 105, such as a home screen application, uses the media engine 110a and skinning API 112 for its skin or graphical interface 120.

Examples of components of a skinning system in an embodiment of the present disclosure are now described. A skin for a home screen application is described in order to describe the structure of the template file. The examples used to illustrate the format of the template document, along with the functionality of the media engine.

Integration of Application and System Data into the Home Screen Skin

A Today style home screen consolidates application and system information and into a single view. This information will be organized according to the theme designer's layout specified in a home screen SVG file.

Today Home Screen Elements

Figure 6:
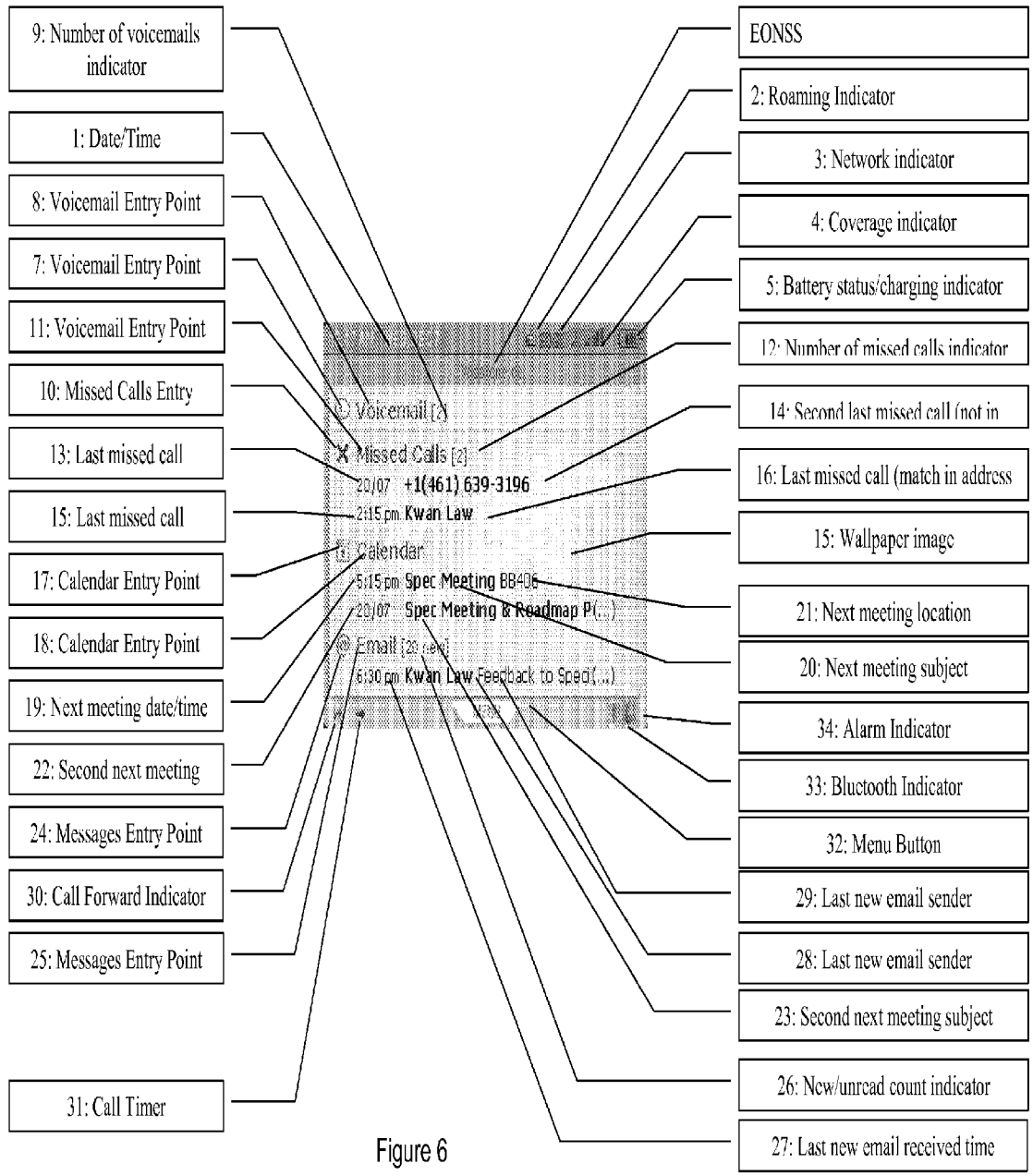
FIG. 6 shows in a screenshot an example of a Today style home screen view, in accordance with an embodiment of the present disclosure.
Figure 7A:
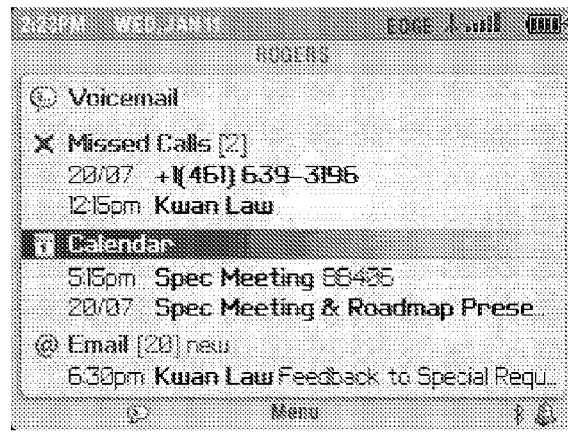
FIGS. 7a, 7b and 7c illustrate in screenshots examples of calendar integration into a home screen, in accordance with an embodiment of the present disclosure.
Figure 7B:
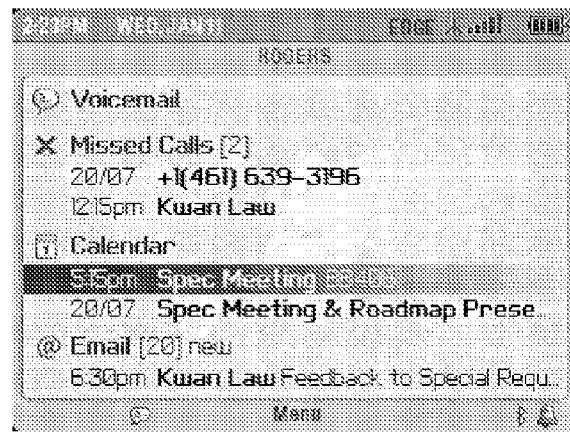
Figure 7C:
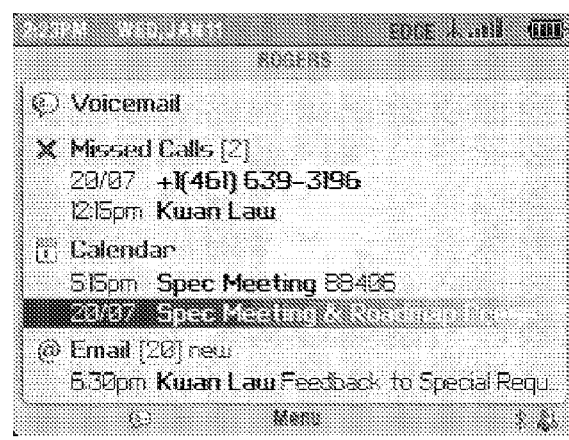

FIG. 6 shows in a screenshot an example of a Today style home screen view, in accordance with an embodiment of the present disclosure.

User Configuration of Home Screen

The set of applications (and associated data) is determined by the elements of an SVG file that is incorporated into the theme. Preferably, user configuration of the fixed set of applications that are represented on the Today style home screen include the following The representation of item 26 in FIG. 6 is user configurable from Message Status Options. I.e., whether unread, new or nothing is displayed.

The representation of items 13, 15, 19 and 22 in FIG. 6 are dependant on the date representation of the current locale and the user's selection of Time Format.

Integrating Application Data into SVG

The home screen supports the ability to incorporate special "data elements" into the skin file. A data element is a place holder in the skin for user data or system information. This will allow the skin designer to specify a template of the home screen while allowing application to fill in the contents with the appropriate information. Data elements for specific applications are defined within each sub feature. The skin designer can control the appearance and behavior of the data elements through any supported SVG syntax. The set of data elements that the home screen designer can incorporate into the skin is collectively referred to as the "data palette". Example data elements include:

```
<g id="hs1" font-family="BBMillbank" font-size="10">
    <text id="email1time" x="30" y="200"></text>
    <text id="email1From" x="50" y="200" font-style="Bold"></text>
    <text id="email1Subject" x="100" y="200"></text>
    <set xlink:href="caret" attributeName="y" begin="focusin" to="200"
    fill="freeze"/>
    <loadScene begin="activate" xlink:href="x-
    exec://LaunchInternal?id=email1"/>
</g>
``` email1 Time, email1 From, email1 Subject are examples of data elements that are populated with application (in this case messages) specific information by the home screen application. Data elements for each application are described within their respective subsection of this document.

Navigation

The home screen SVG layout will allow the creation of user selectable hotspots. For example, the skin designer may create a hotspot that highlights the row containing the last new received email (labels 27, 28, 29 FIG. 6). The user may focus on this hotspot by rolling the trackwheel. The SVG syntax allows the home screen designer to specify an action associated with focus in, focus out and activate (I.e., clicking the thumbwheel). The navigation order is the order that the hotspots are defined in the SVG. An example of an SVG hotspot includes:

```
<image id="caret" x="30" y="180" width="200" height="30"
    xlink:href="caretBar.png"></image>
<g id="hs1" font-family="BBMillbank" font-size="10">
    <text id="email1time" x="30" y="200"></text>
    <text id="email1Sender" x="50" y="200" font-style="Bold"></text>
    <text id="email1Subject" x="100" y="200" </text>
```

```
    <set xlink:href="caret" attributeName="y" begin="focusin" to="200"
        fill="freeze"/>
    <loadScene begin="activate" xlink:href="x-
        exec://LaunchInternal?email1"/>
</g>
```

In the above example a hotspot is provided that has a focusin and activate action. The focusin <set> translates the caret image to the correct location. The <loadScene> element will open the message that corresponds to the email1 data element.

Dynamic Layout

Layout presents a challenge when implementing a home screen that incorporates text that can have varying length. Examples of such strings include email subject/sender, calendar subject/location, etc. A layout manager is used to handle the dynamic length of the data elements that are populating the home screen template.

Unfortunately, SVG does not provide this ability natively. An extension to the language is provided that allows the specification of how data elements are laid out with respect to each other. In the Today style view, the requirements call for a column-wise layout of data elements. For example, the requirements for calendar integration state "Subject. If the subject is too large to fit the available space it will be terminated with " . . . "
Location. If the location is too large to fit the available space it will be terminated with " . . . "
Preferably, each element has independently themed text styles. The time and subject fields will be left aligned into a column. The subject field will be given a maximum width and the location field will immediately follow the subject field.

The above involves the home screen providing a column-wise layout manager where each column specifies an available/maximum space and a rule for truncating the string if it is too long to fit within that space. If a field has a display attribute that is set to "none" it will not occupy any space for the purposes of laying out subsequent text elements. The home screen skin has the ability to specify a layout manager that controls the position of data elements within the skin. For example, a <foreignObject> element may specify a layout rule and references elements within the skin file. For example:

```
<foreignObject>
<image x="81" y="216" width="230" height="20" xlink:href="x-
    object:/layout?ids=calendar2subject;calendar2location&width=
    230&spacing=5&ellipsis=..."/>
</foreignObject/>
```

Another possibility is to use compound documents html tables+svg.

Default Application Representation

The home screen provides the ability to refer to application descriptions within the home screen SVG file using the <image> element or <text> element. These are different ways to specify an application name. The <text> method is generally better because it can leverage the SVG syntax and features. The <image> method is legacy. The application is identified by specifying its module name and entry point as the value of the "id" parameter of the xlink:href attribute. An application description is referenced by prefixing the xlink:href attribute with the string "x-object:/EntryDescription". The application description will be retrieved from the ApplicationEntry class. An example of an application description for Phone application includes:

```
<image x="32" y="65" width="276" height="24" xlink:href="x-
    bject:/EntryDescription?font-family=BBClarity&font-
    size=15&font-
    style=bold&id=net_rim_bb_phone_app.Phone&align=
    left&width=276&height=24&enclosing=
    ( )&showname&showinfo">
    <set attributeName="visibility" begin="hs1.focusin" to="visible"
        fill="freeze"/>
    <set attributeName="visibility" begin="hs1.focusout" to="hidden"
        fill="freeze"/>
</image>
```

An alternate representation using a <text>"data element" for the application description called "calendar app" is:

```
<text id="calendar_app" x="32" y="180" style=
    "font-family:BBCondensed; font-size:12; font-weight:bold;
    fill:#394142">
    <set attributeName="fill" to="#FFFFFF" begin="hs5.focusin"
        end="hs5.focusout"/>
</text>
```

The above example specifies an image that is the focused state of messages application description. Note that the <set> animations will toggle the visibility attribute of the <image> element when it receives and looses focus.

Below is an example of a summary table of the xlink:href url parameters for EntryDescription. This summary table applies to the <image> method for specifying application descriptions. The <text> element supports all the attributes of SVG. The <image> mechanism supports an overlapping set but there can be some attributes that are supported by <image> that are not supported by <text> (I.e., showInfo) in one implementation.

| Name | Type | Value | Default |
|---|---|---|---|
| font-family | Optional | Font name | System default |
| font-style | Optional | PLAIN, BOLD, ITALIC | PLAIN |
| font-size | Required | Integer | none |
| Foreground-color | Optional | Integer in HEX | 0 = BLACK |
| Id | Required | Application Entry name | none |
| Align | Optional | Left, center, right | left |
| Width | Required | Integer. | none |
| Height | Required | Integer | none |
| Enclosing | Optional | ( ) or {} or [ ] | blanks = no enclosing |
| Showinfo | Optional | boolean | if present, the Application Name is displayed |
| Showname | Optional | boolean | if present, the unread count (or new count) is displayed |

Application Icons

The home screen provides the ability to refer to application icons within the home screen SVG file using the <image> element. An application icon is referenced by prefixing the xlink:href attribute with the string "x-object:/EntryIcon". The application is identified by specifying it's module name and entry point as the value of the "id" parameter of the xlink:href attribute. The icon will be retrieved from the RibbonIconField class in one implementation SVG can refer to an application icon that is provided by the skin (hard coded) or can refer to an icon that is provided by the application it's self. The x-object:/EntryIcon xlink:href attribute provides the mechanism for referring to an application icon that is provided by the application. The non x-object mechanism refers to an image file directly, i.e., xlink:href="messageIcon.png".

Focused Representation

Application icons may have a focused and unfocused representation. This is specified by the presence of the "focus" parameter of the xlink:href attribute. For example:

```
<image x="-4" y="206" width="48" height="36" xlink:href="x-
    object:/EntryIcon?focus&id=net.rim.-
    ProfileHomeScreenApp&size=36&width=
    48&height=36"/>
```

An EntryIcon which does not include to "focus" parameter will be rendered in the unfocused state. For example:

```
<image x="-4" y="206" width="48" height="36" xlink:href="x-
    object:/EntryIcon?id=net.rim.ProfileHomeScreenApp&size=
    36&width=48&height=36"/>
```

Preferably, it is the responsibility of the SVG to define animations (I.e., using <animate> or <set> elements) which toggle the visibility of the focused and unfocused icon representations. Visibility, opacity and x,y location are attributes of this kind of foreign object element that are animatable through SVG.

Every application will have a minimum, default visual representation that is used for that application. In addition to this representation, some applications will define alternative representations for use in specific situations such as the home screen, or in banners for example. For Messages, at a minimum, it provides an icon and a name. This default representation is used in icon themes using the icon grid layout and in an applications list (such as the BlackBerry Applications List). In one theme, Messages can be represented on the home screen along with a count. In the banner it provides a smaller envelope and a count, but no name. In another theme's skin, it can provide a list of the most recent new emails. These additional representations are defined above and beyond the minimum, default representation of an icon and a name. Elements of the default representation can be defined by the theme, or as resources within the application itself. An example of elements of the default representation are as follows:

Name: The themed name overrides the name provided by the application.

Icon (optional): The themed icon overrides the icon provided by the application. If neither icon is available, the default application icon provided by the theme is used.

Icon—in-focus (optional): This icon is used when the icon is in focus. If no icon is available, the normal icon is used.

Icon—disabled (optional): This icon is used when the application is visible, but disabled. For example, when there are no browser service books, the default browser is disabled. If no icon is available, the normal icon is used.

Unread Count Representations

There are different ways of specifying an unread count in the home screen SVG syntax. In one method (Method 1) a foreignOject mechanism is used:

```
<image x="99" y="40" width="35" height="13" xlink:href="x-
    object:/UnreadCount?type=email
    &align=left&width=35&height=13"/>
```

Method 1 allows the home screen to embed an unread count for email. Associating an application entry with an unread count would prohibit the unread count from being associated with an EntryDescription or EntryIcon (which is an open slot). method 1 from being used in a slot type home screen design. A slot design refers to the ability to specify application placeholders that are dynamically populated based on the order of applications in an applications list (such as the Blackberry Applications List).

In another foreign object method (Method 2) of including the unread count with the application name:

```
<image x="32" y="65" width="276" height="24" xlink:href="x-
    object:/EntryDescription?font-family=BBClarity&font-
    size=15&font-
    style=bold&id=net_rim_bb_phone_app.Phone&align=
    left&width=276&height=24&enclosing=( )&
    showname&showinfo " ></image>
```

Method 2 can optionally specify a "showinfo" parameter which will render extra info if such info is provided by the application (see 3.12.1.6). The extra info that an application provides is not under control of the theme or SVG skin. This extra info is typically an unread or new count. If the "showinfo" parameter is specified the info will be displayed immediately to the right of the description.

For example: Messages (1): If the unread count is 0 the count and braces will not be displayed. In some circumstances the fact that the unread count is displayed next to the name may be configurable by the user via some option. For example the configuration of feature 3.10 (new message status options) will determine whether or not the count is displayed as well as its meaning (I.e., new vs. unread).

Another possible approach to integrating unread counts into the skin through the use of <text> and <tspan> elements with known IDs, i.e., data elements. This may be a superior approach because it will give more control to the home screen skin over how the unread counts are rendered. It would also allow the counts to be animated. For example:

```
<text id="messagesName" font-name="BBCasual" font-size="10" font-
    style="bold">
<tspan font-style="plain">[</tspan>
<tspan id="messagesInfo" font-style="plain"></tspan>
<tspan font-style="plain">]</tspan>
</text>
```

This is a Non foreign object way of specifying application names and unread count using only data elements (I.e., id="messagesName" and id="messagesInfo") and leverages the syntax and features of SVG. In the above example the ids "messagesName" and "messagesInfo" would be recognized by the home screen application and the appropriate info would be substituted into the skin.

User Configurable Application Slots

The home screen skin may reference an application in the applications list (i.e., Blackberry Applications List) by specifying its numerical order in the list starting at 0 which is the first element in the list. For example:

```
<image x="280" y="104" width="39" height="29" xlink:href="x-
    object:/EntryIcon?id=slot0&size=29&width=39&
    height=29">
</image>
```

In this case, id=slot0 specifies that the skin is referencing the first application in the applications list.

The home screen will allow the skin designer to integrate items from the applications list into the home screen layout. The skin designer will be able to specify the location of the menu item slots and their position within the navigation order of the screen. The applications that occupy these slots will be configurable by the user. For applications that extend the default representation, the default extensions will also be shown.

Calendar Integration into Home Screen Skin

This feature provides the ability to integrate calendar information into a home screen SVG skin. FIGS. 2a, 2b and 2c illustrate in screenshots examples of calendar integration into a home screen skin, in accordance with an embodiment of the present disclosure.

Calendar Event Order

The data elements for calendar will reference calendar events according to their ordinal position in a list sorted by the following criteria:

1: Start time (earliest to latest).
2: Creation time (earliest to latest).

In addition, the list will be filtered according to the following criteria:

1: Exclude calendar events which have finished.

The skin is updated whenever the list is modified. The list is updated when any of the following actions occur:

Device Date/Time is modified by the user.
Device time zone changes.
Device boots.
An event is replaced by another calendar event.
An event is deleted.
An event is updated.
An event ends.

The following table describes the data elements related to calendar which may be incorporated into the home screen SVG skin. Descriptions of the columns are as follows:

Element name: The name of the "id" attribute. This identifies the element to the home screen skin. These names are case sensitive and must be specified exactly as shown in the table.

Elements description: A description of the application data that will populate the element.

Element type: The SVG element type of the data element. The data element must be of the specified type.

| Element name | Element description | Element type |
| --- | --- | --- |
| calendar<n>time | The time/date of the nth calendar event in the list of calendar events. The time is formatted according to the "Time Format" setting in the Date/Time options screen. If the event occurs in the current calendar day (in the local time zone) only the time is shown. If the event occurs in a future calendar day (in the current time zone) only the date is shown. The date will be formatted with net.rim.device.api.i18n.SimpleDateFormat in accordance with the DATE_FORMAT_STRING key in Ribbon.rrh. | <text> |
| calendar<n>subject | The subject line of the nth calendar event in the list of calendar events. The text will be truncated with an ellipsis if it is too long to fit within the available space given by the layout manager. | <text> |
| calendar<n>location | The location of the nth calendar event in the list. The text is truncated with an ellipsis if it is too long to fit within the available space given by the layout manager. | <text> |

Application Entry Points

The home screen SVG syntax will provide the ability to launch the nth calendar item in the Calendar Event through the <loadScene> element. For example:

```
<loadScene begin="activate" xlink:href="x-
    exec://LaunchInternal?calendar1/>
```

The above example opens the first calendar event in the calendar event list. The home screen SVG syntax provides the ability to launch the calendar application through the <loadScene> element For example:

```
<loadScene begin="activate" xlink:href="x-
    exec://net_rim_bb_calendar_app.Calendar/>
```

The above example launches the calendar application. The default view will be displayed.

Custom Events

The home screen skin has the ability trigger animations on custom events related to the data elements described in the data palette. This may be used to trigger animation effects when information/status is updated. Below is a table that describes an example of custom events for calendar:

| Event name | Event Description |
|---|---|
| Calendar<n>begin | The nth calendar event has begun. |
| Calendar<n>endpre | The nth calendar event is ending. This event is fired prior to the data elements in the skin being updated as a result of the nth calendar event ending. The skin has an opportunity to trigger a custom animation such as a transition out effect (For example a fade out or animation off the screen). If the skin does not define an animation on calendar<n>endpre then calendar<n>endpost (see below) is fired immediately. If the skin defines an animation on calendar<n>endpre it waits until all animations beginning on this event have completed before firing calendar<n>endpost. Preferably, animations are not defined that have dur = "indefinite" otherwise calendar<n>endpost will never be fired. |
| calendar<n>endpost | The nth calendar event has begun. This event is fired after all of the data elements related to calendar (see data element table) have been updated. |

The following SVG illustrates how to achieve a fade out and fade in effect before and after the data is updated for the calendar1 event:

```
<g id="hs1" font-family="BBMillbank" font-size="10">
  <text id="calendar1time" x="30" y="200"></text>
  <text id="calendar1Subject" x="50" y="200" font-style="Bold">
  </text>
  <text id="calendar1Location" x="100" y="200" </text>
  <animate attibuteName="fill-opacity" to="0" dur="2s"
    begin="calendar1EndPre" fill="freeze"/>
  <animate attributeName="fill-opacity" to="1" dur="2s"
    begin="calendar1EndPost" fill="freeze"/>
</g>
```

Preferably, there is also a mechanism of getting the skin into the correct state if the device was off for some reason when the event was supposed to happen.

Calendar status will include the ability to represent 1-n of upcoming calendar events for the current day. Clicking on these events will open them or bring up a context sensitive menu if requirement 10 is supported. These events will include:

If the event is scheduled today, the time will be shown using the localized time format.

If the event is scheduled beyond today, the date will be shown using a localized MM/DD format.

Subject. If the subject is too large to fit the available space it will be terminated with " . . . "

Location. If the location is too large to fit the available space it will be terminated with " . . . "

Each element will have independently themed text styles. The time and subject fields will be left aligned into a column. The subject field will be given a maximum width and the location field will immediately follow the subject field.

Preferably, calendar events will be removed from the list when the meeting ends. The exception will be all day events, which will be removed 1 hour before the start of the meeting that will bump it off the list.

Phone Integration into the Home Screen Skin

Figure 8A:
FIGS. 8a and 8b show in screenshots examples of phone integration into the home screen skin, in accordance with an embodiment of the present disclosure.
Figure 8B:

FIGS. 8a and 8b show in screenshots examples of phone integration into the home screen skin, in accordance with an embodiment of the present disclosure.

Data Element Table

| Element name | Data description | Home Screen skin SVG element type |
|---|---|---|
| missedcalls<n>time | The time of the nth last missed call. The time is formatted according to the "Time Format" setting in the Date/Time options screen. If the event occurs in the current calendar day (in the local time zone) only the time is shown. If the event occurs in a past calendar day (in the current time zone) only the date is shown. Preferably, the date is formatted with net.rim.device.api.i18n.SimpleDateFormat in accordance with the DATE_FORMAT_STRING key in Ribbon.rrh. | <text> |
| missedcalls<n>info | The info of the nth missed call. For example (name or phone number or unknown number). If an address entry exists for the phone number it shows the caller's name. If the name is too long to fit the available space defined by the layout manager, it is terminated with ". . ." | <text> |

Alternate Application Representation

The home screen SVG supports the integration of an icon and text representation for an application. This is accomplished by specifying an EntryIcon and EntryDescription <image>. The EntryIcon and EntryDescription for phone will display alternate representations depending on whether or not there are new missed calls. If there are new missed calls the EntryDescription will display "Missed Calls"

whereas if there are no new missed calls it will display "Phone." The EntryIcon will display a different icon depending on whether there are missed calls or not.

Application Entry Points

The home screen SVG syntax also provides the ability to launch the phone application directly through the <loadScene> element. For example:

```
<loadScene begin="activate" xlink:href="x-
    exec://net_rim_bb_phone_app.Phone/>
```

This is related to requirement a) noted above, i.e., that the application should be able to react to user input from the GUI. This ability allows an application to register for events that are generated by clicking on an SVG element. The application registers itself with the Media Engine API as a MediaListener. When an event is generated by the <loadScene> element a notification is made to the registered MediaListener implementation. The implementation receives a notification that includes the xlink:href URI which the code can use to determine which element was clicked and take appropriate action.

Another example of a mechanism for SVG to register for notifications does not use the <loadScene> element. The application listens for activate events on the element directly rather than <loadScene> elements which are triggered off of activate events. As long as the element is focusable the activate event will be generated. A focusable element is one that has an infocus, outfocus or activate <animate> defined for the element. For example:

```
<image id="myImage" x="110" y="19" width="20" height="18"
    xlink:href="myImage.png">
<!-- dummy <set>: begin conditions of this node allow external listeners
to
    listen to the activate events. (If there was nothing in the SVG
    dependant on the activate events, they wouldn't get processed
    or fired to the external listeners) -->
    <set attributeName="visibility" to="visible"
    begin="myImage.activate"/>
</image>
```

Specifying a Launch Phone action that is tied to an arbitrary key event: The home screen will provide the ability to define an entry point which is tied to an access key. For example:

```
<loadScene begin="foo.accessKey("send ")" xlink:href="x-
    exec://net_rim_bb_phone_app.Phone/>
```

In the example "foo" is the name of the element which must be in focus in order to trigger the loadScene event. accessKey("send") is the key event upon which to trigger or begin the action. The example essentially says "launch the phone application when the element named "foo" is in focus and the send key is pressed."

Specifying a Launch Phone action with an optional dial number parameter: The phone application entry point will be able to accept a parameter which is a command to dial followed by the number to dial. For example:

```
<loadScene begin="foo.accessKey("send ")" xlink:href="x-
    exec://net_rim_bb_phone_app.Phone?command=
    dial:<missedcalls1>/>
```

-continued

```
<loadScene begin="foo.accessKey("send")" xlink:href="x-
    exec://dialselected"/>
```

In the example command=dial:<number> is the action that is passed to the phone application when the loadScene action begins. The home screen application should substitute the appropriate number into <missedcalls1> before passing to the phone application since the term "missedcalls1" is a home screen construct unknown to the phone application. The example says "launch phone application and dial the number matching <missedcalls1> when the element named "foo" is in focus and the send key event is pressed Specifying a Launch Call Log Entry Context Menu action: The home screen SVG syntax will provide the ability to launch a popup menu for a call log entry corresponding to a missed call data element. This behavior can be specified through the <loadScene> element in the home screen SVG file. For example:

```
<loadScene begin="activate" xlink:href="x-
    exec://LaunchInternal?missedcalls1 />
```

SMS and MMS Integration into the Home Screen

Figure 9:
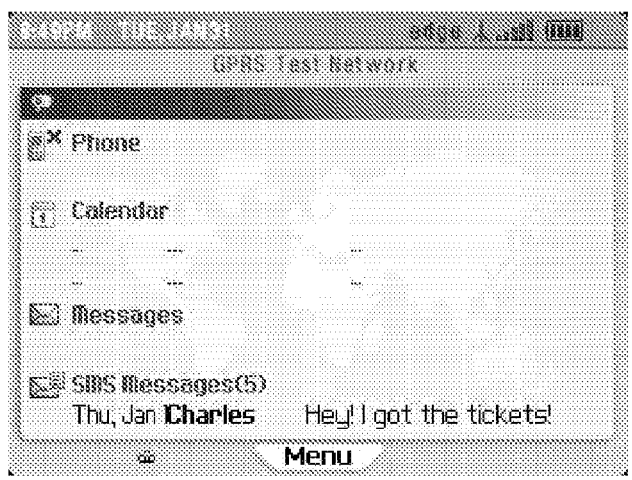
FIG. 9 shows in a screen shot an example of SMS and MMS integration into the home screen, in accordance with an embodiment of the present disclosure.

FIG. 9 shows in a screen shot an example of SMS and MMS integration into the home screen, in accordance with an embodiment of the present disclosure.

Data Element Table

| Element name | Element description | Element type |
|---|---|---|
| sms<n>time | The time of the nth last new sms or mms message. The time is formatted according to the "Time Format" setting in the Date/Time options screen. If the message was received in the current calendar day (in the local time zone) only the time is shown. If the email was received in a past calendar day (in the current time zone) only the date is shown. The date will be formatted with net.rim.device.api.i18n.SimpleDateFormat in accordance with the DATE_FORMAT_STRING key in Ribbon.rrh. If "Display Time" is set to no in Messages Options –> General Options, this field is not displayed. I.e., its "display" attribute is set to "none". | <text> |
| sms<n>from | The sender of the nth last new sms or mms message. If an address book entry exists for the email address, the contact name is shown instead. If the contact name or email address is too large to fit in the available space it is truncated with ". . .". If "Display Name" is set to no in Messages Options –> General Options, this field will not be displayed. I.e., its "display" attribute is set to "none". | <text> |
| sms<n>body | The body of the nth last new email. If the body is too large to fit in the available space it is truncated with ". . .". If the body is empty nothing is displayed. | <text> |

Application Entry Points

The home screen SVG syntax will provide the ability to define a <loadScene> element which opens a message associated with a data element. SVG syntax for opening a message:
    <loadScene begin="activate" xlink:href="x-exec://LaunchInternal?sms1/>

The above example opens the sms or mms message associated with sms1 from the data element table.

The home screen SVG syntax provides the ability to define a <loadScene> element which opens the combined sms and mms inbox. It will do this by specifying the module name and entry point name. SVG syntax for opening the messages application:

```
<loadScene begin="activate" xlink:href="x-exec://
    net_rim_bb_messaging_app.sms_and_mms"/>
```

New/Unread Message Count

The count associated with the combined SMS and MMS entry point is configurable via the message status options screen. The text style and enclosing braces is configurable in the home screen SVG.

Home Screen Area of Organize Applications

The Home Screen SVG skin file may specify "slots" for applications as described. A (themeable) area is rendered at the top of Organize Applications screen that indicates how many slots are available and which applications occupy them. This area has a title called "Home Screen". The size of the area depends on the number of slots available in the home screen skin. The user may move applications in and out of this area through the normal move operation in Organize Applications. Slots which are assigned to fixed applications in the home screen skin do not appear in the list. Preferably, care is taken by the theme developer not to prioritize applications that are assigned to fixed slots in such a way as they would also occupy a position in the Home Screen area. For example if "Messages" occupies a fixed position on the home screen the theme should set the position of messages so that it does not occupy any of the free slots. This prevents messages from appearing twice on the home screen.

Figure 10:
FIG. 10 illustrates an example of the concept of a Home Screen area inside Organize Applications, in accordance with an embodiment of the present disclosure.

FIG. 10 illustrates the concept of a Home Screen area inside Organize Applications, in accordance with an embodiment of the present disclosure. The area in light grey represents the slots which are available on the home screen and the applications that currently occupy them.

The applications which occupy positions in the Home Screen area also occupy the top positions in the applications list popup. Applications which occupy slots in the home screen should also be accessible from the applications list because this popup can be launched from within any application via a convenience key mapping.

Preferably, an application which is hidden is not moveable to a position in the Home Screen area of Organize Applications. This is to prevent hidden applications from occupying a slot on the home screen. Likewise, applications which occupy a position in the Home Screen area of Organize Applications are not hideable.

If the home screen skin contains configurable application slots as described, these are configured through the organize applications screen. The contents of the home screen application slots are based on the items at the top of the application menu order. If there are 5 slots, then the 5 applications at the top of the list would be populated into these slots. The organize applications screen indicates how many of the applications appear on the home screen by drawing a themeable region underneath the icons that fill the available slots. This region has a read-only label at the top that says "Home Screen". So if a skin has 2 slots, the top 2 icons appear over this region. If it has 5 slots, then the top 5 appear over this region.

Figure 11:
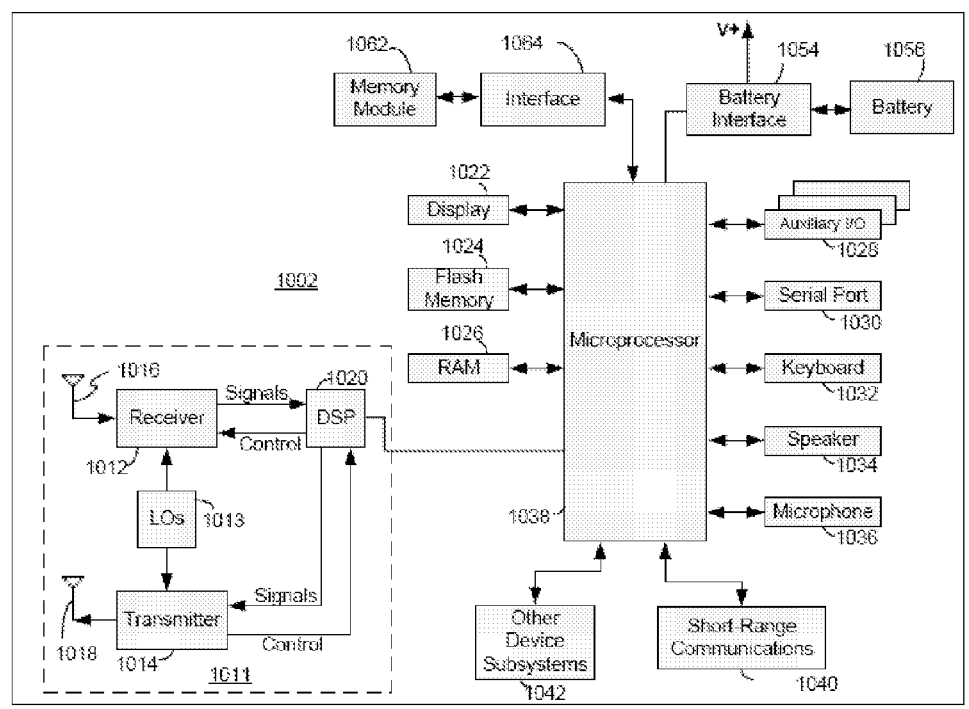
FIG. 11 shows in a detailed block diagram an example of a preferred handheld device adapted in accordance with an embodiment that may be used as an electronic device having message and organization system functions and a home screen GUI in accordance with an embodiment of the present disclosure.

FIG. 11 shows in a detailed block diagram an example of a preferred handheld device 1002 adapted in accordance with an embodiment that may be used as an electronic device having message and organization system functions and a home screen GUI as described. Handheld device 1002 is preferably a two-way communication device having at least voice and advanced data communication capabilities, including the capability to communicate with other computer systems. Depending on the functionality provided by handheld device 1002, it may be referred to as a data messaging device, a two-way pager, a cellular telephone with data messaging capabilities, a wireless Internet appliance, or a data communication device (with or without telephony capabilities). Handheld device 1002 may communicate with any one of a plurality of base station transceiver systems (not shown) within its geographic coverage area.

Handheld device 1002 will normally incorporate a communication subsystem 1011, which includes a receiver 1012, a transmitter 1014, and associated components, such as one or more (preferably embedded or internal) antenna elements 1016 and 1018, local oscillators (LOs) 1013, and a processing module such as a digital signal processor (DSP) 1020. As will be apparent to those skilled in field of communications, particular design of communication subsystem 1011 depends on the communication network in which handheld device 1002 is intended to operate.

Handheld device 1002 may send and receive communication signals over the network after required network registration or activation procedures have been completed. Signals received by antenna 1016 through the network are input to receiver 1012, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 1020. In a similar manner, signals to be transmitted are processed, including modulation and encoding, for example, by DSP 1020. These DSP-processed signals are input to transmitter 1014 for digital-to-analog (D/A) conversion, frequency up conversion, filtering, amplification and transmission over communication network via antenna 1018. DSP 1020 not only processes communication signals, but also provides for receiver and transmitter control. For example, the gains applied to communication signals in receiver 1012 and transmitter 1014 may be adaptively controlled through automatic gain control algorithms implemented in DSP 1020.

Network access is associated with a subscriber or user of handheld device 1002, and therefore handheld device 1002 comprises a memory module 1062, memory module card or a Removable User Identity Module (R-UIM), to be inserted in or connected to an interface 1064 in order to operate in the network. Alternatively, memory module 1062 may be a non-volatile memory that is programmed with configuration data by a service provider so that mobile station 1002 may operate in the network. Since handheld device 1002 is a mobile battery-powered device, it also includes a battery interface 1054 for receiving one or more rechargeable batteries 1056. Such a battery 1056 provides electrical power to most if not all electrical circuitry in handheld device 1002, and battery interface 1054 provides for a mechanical and electrical connection for it. The battery interface 1054 is coupled to a regulator that provides power V+ to all of the circuitry.

Handheld device 1002 includes a microprocessor 1038 that controls overall operation of mobile station 1002. Communication functions, including at least data and voice communications, are performed through communication subsystem 1011. Microprocessor 1038 also interacts with additional device subsystems such as a display 1022, a flash memory 1024, a random access memory (RAM) 1026, auxiliary input/output (I/O) subsystems 1028, a serial port 1030, a keyboard 1032, a speaker 1034, a microphone 1036, a short-range communications subsystem 1040, and any other device subsystems generally designated at 1042. Some of the subsystems shown perform communication-related functions, whereas other subsystems may provide "resident" or on-device functions. Notably, some subsystems, such as keyboard 1032 and display 1022, for example, may be used for both communication-related functions, such as entering a text message for transmission over a communication network, and device-resident functions such as a calculator or task list. Operating system software used by microprocessor 1038 is preferably stored in a persistent store such as flash memory 1024, which may alternatively be a read-only memory (ROM) or similar storage element (not shown). Those skilled in the art will appreciate that the operating system, specific device applications, or parts thereof, may be temporarily loaded into a volatile store such as RAM 1026.

Microprocessor 1038, in addition to its operating system functions, preferably enables execution of software applications on handheld device 1002. A predetermined set of applications that control basic device operations, including at least data and voice communication applications, will normally be installed on handheld device 1002 during its manufacture. A preferred application that may be loaded onto handheld device 1002 may be a personal information manager (PIM) application having the ability to organize and manage data items relating to a user such as, but not limited to, e-mail, calendar events, voice mails, appointments, and task items. Naturally, one or more memory stores are available on handheld device 1002 and memory module 1062 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on handheld device 1002 with respect to such items. This is especially advantageous where the host computer system is the mobile station user's office or enterprise computer system. Additional applications may also be loaded onto handheld device 1002 through network, an auxiliary I/O subsystem 1028, serial port 1030, short-range communications subsystem 1040, or any other suitable subsystem 1042, and installed by a user in RAM 1026 or preferably a non-volatile store (not shown) for execution by microprocessor 1038. Such flexibility in application installation increases the functionality of handheld device 1002 and may provide enhanced on-device functions, communication-related functions, or both. For example, secure communication applications may enable electronic commerce functions and other such financial transactions to be performed using handheld device 1002.

In a data communication mode, a received signal such as a text message, an e-mail message, or web page download will be processed by communication subsystem 1011 and input to microprocessor 1038. Microprocessor 1038 will preferably further process the signal for output to display 1022 or alternatively to auxiliary I/O device 1028. A user of handheld device 1002 may also compose data items, such as e-mail messages, for example, using keyboard 1032 in conjunction with display 1022 and possibly auxiliary I/O device 1028. Keyboard 1032 is preferably a complete alphanumeric keyboard and/or telephone-type keypad. These composed items may be transmitted over a communication network through communication subsystem 1011.

For voice communications, the overall operation of handheld device 1002 is substantially similar, except that the received signals would be output to speaker 1034 and signals for transmission would be generated by microphone 1036. Alternative voice or audio I/O subsystems, such as a voice message recording subsystem, may also be implemented. Although voice or audio signal output is preferably accomplished primarily through speaker 1034, display 1022 may also be used to provide an indication of the identity of a calling party, duration of a voice call, or other voice call related information, as some examples.

Serial port 1030 in FIG. 11 is normally implemented in a personal digital assistant (PDA)-type communication device for which synchronization with a user's desktop computer as a desirable, albeit optional, component. Serial port 1030 enables a user to set preferences through an external device or software application and extends the capabilities of handheld device 1002 by providing for information or software downloads to handheld device 1002 other than through a wireless communication network. The alternate download path may, for example, be used to load an encryption key onto handheld device 1002 through a direct and thus reliable and trusted connection to thereby provide secure device communication.

Short-range communications subsystem 1040 is an additional optional component that provides for communication between handheld device 1002 and different systems or devices, which need not necessarily be similar devices. For example, subsystem 1040 may include an infrared device and associated circuits and components, or a Bluetooth™ communication module to provide for communication with similarly enabled systems and devices. Bluetooth™ is a registered trademark of Bluetooth SIG, Inc.

Handheld device 1002 may be configured such as via software (instructions and data) to provide the home screen integrated presentation of information in a GUI as described above.

The system and methods according to the present patent disclosure may be implemented by any hardware, software or a combination of hardware and software having the above described functions. The software code, either in its entirety or a part thereof, may be stored in a computer-readable memory. Further, a computer data signal representing the software code which may be embedded in a carrier wave may be transmitted via a communication network. Such a computer-readable memory and a computer data signal are also within the scope of the present patent disclosure, as well as the hardware, software and the combination thereof.

While particular embodiments of the present patent disclosure have been shown and described, changes and modifications may be made to such embodiments without departing from the true scope of the patent disclosure.

What is claimed:
1. A mobile communication device comprising:
a display;
a processor coupled to the display; and
a memory coupled to the processor containing instructions which when executed by the processor provide:
at least one application;
at least one skinning theme document; and a media engine comprising:
a parser for parsing the at least one skinning theme document into a template describing rendering characteristics of a graphical interface, the skinning theme document identifying at least one data element;
an interaction interface for receiving data from the at least one application associated with one or more of the at least one data element; and
a renderer for rendering the received data in accordance with the template as the graphical interface wherein the graphical interface presents one or more data elements of the at least one application that is rendered,
wherein the skinning theme document identifies at least one custom event, wherein the interaction interface further receives a notification from the at least one application of an occurrence of one or more of the at least one custom event, and wherein the renderer renders the graphical interface based on the occurrence of one or more of the at least one custom event.

2. The mobile communication device of claim 1, wherein the media engine further comprising:
a layout manager for controlling presentation of one or more data elements in the template before rendering of the graphical interface.

3. The mobile communication device as claimed in claim 2, wherein the template further comprises at least one of:
layout manager control information for defining how the layout manager controls display of the template; and
renderer control information for controlling:
how the renderer renders the data elements; and
how the renderer renders the graphical interface based on at least one custom event.

4. The mobile communication device as claimed in claim 3, wherein layout manger control information comprises at least one of:
information for dynamically modifying a length of at least one data element of a set of data elements prior to being rendered; and
information for controlling the display of the template to the graphical interface that the renderer cannot render.

5. The mobile communication device as claimed in claim 1, wherein each application of the at least one application comprises:
at least one application data element; and
application code.

6. The mobile communication device as claimed in claim 5, wherein the application code comprises:
code for modifying the at least one application data element;
code for creating at least one application custom event; and
code for communicating at least one of the application data element and at least one of the application custom event to the media engine using the interaction interface.

7. The mobile communication device as claimed in claim 1, further comprising an event engine for providing event notification to the application.

8. The mobile communication device as claimed in claim 1, wherein the interaction interface comprises a content interaction application programming interface (API) including calls for:
updating data elements;
notification of custom events;
querying of new events;
getting a new event; and
registering an event listener.

9. The mobile communication device as claimed in claim 1, wherein the template comprises a mark-up language description of:
a set of data element objects;
a set of custom event objects;
layout manager control information; and
renderer control information.

10. The mobile communication device of claim 1 wherein the skinning theme document defines the graphical interface in scalar vector graphics (SVG) format.

11. The mobile communication device of claim 10 wherein parsing the skinning theme document comprises SVG transcoding the skinning theme document into code representing the template.

12. The mobile communication device as claimed in claim 1, the media engine further comprising:
a layout manager for controlling presentation of one or more data elements in the template before rendering of the graphical interface;
wherein the template further comprises at least one of:
layout manager control information for controlling how the layout manager controls the display of the template; and
renderer control information for controlling:
how the renderer renders a set of data element objects; and
how the renderer renders the graphical interface based on at least one custom event of a set of custom events.

13. The mobile communication device as claimed in claim 12, wherein layout manger control information comprises at least one of:
information for dynamically modifying a length of at least one data element of the set of data elements prior to being rendered; and
information for controlling the display of the template to the graphical interface that the renderer cannot render.

14. The mobile communication device as claimed in claim 13, wherein the interaction interface comprises a content interaction application programming interface, API including calls for:
updating data elements;
notification of custom events;
querying of new events;
getting a new event; and
registering an event listener.

15. The mobile communication device as claimed in claim 14, wherein the skinning theme document comprises a mark-up language description of:
a set of data element objects;
a set of custom event objects;
layout manager control information; and
renderer control information.

16. The mobile communication device of claim 15 wherein the skinning theme document defines the graphical interface in scalar vector graphics (SVG) format.

17. The mobile communication device of claim 16 wherein parsing the skinning theme document comprises SVG transcoding the skinning theme document into code representing the template.

18. A non-transitory computer readable memory containing instructions which when executed by a processor of a mobile communication device cause the processor to provide:

a parser for parsing at least one skinning theme document into a template describing rendering characteristics of a graphical interface, the skinning theme document identifying at least one data element;

an interaction interface for receiving data from at least one application associated with one or more of the at least one data element; and a renderer for rendering the received data on a display in accordance with the template as the graphical interface wherein the graphical interface presents one or more data elements of the at least one application that is rendered, wherein the skinning theme document identifies at least one custom event, wherein the interaction interface further receives a notification from the at least one application of an occurrence of one or more of the at least one custom event, and wherein the renderer renders the graphical interface based on the occurrence of one or more of the at least one custom event.

* * * * *